(12) United States Patent
Millson et al.

(10) Patent No.: US 12,714,936 B2
(45) Date of Patent: Aug. 25, 2026

(54) PROCESSING DEVICES AND METHODS

(71) Applicant: Sony Interactive Entertainment Inc., Tokyo (JP)

(72) Inventors: Jason Craig Millson, London (GB); Maria Chiara Monti, London (GB); Carl Pryke, London (GB); Christopher George Buchanan, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 312 days.

(21) Appl. No.: 18/471,799

(22) Filed: Sep. 21, 2023

(65) Prior Publication Data

US 2024/0115935 A1 Apr. 11, 2024

(30) Foreign Application Priority Data

Oct. 5, 2022 (GB) .................................... 2214632

(51) Int. Cl.
*A63F 13/22* (2014.01)
*A63F 13/45* (2014.01)

(52) U.S. Cl.
CPC .............. *A63F 13/22* (2014.09); *A63F 13/45* (2014.09)

(58) Field of Classification Search
CPC ........ A63F 13/22; A63F 13/422; A63F 13/42; A63F 13/45; A63F 13/533; A63F 13/5375; A63F 13/67; A63F 13/798
See application file for complete search history.

(56) References Cited

U.S. PATENT DOCUMENTS 8,719,714 B2 * 5/2014 Aronzon ................ G06F 3/023 463/43
10,279,264 B1 * 5/2019 Aghdaie ................ A63F 13/67
11,338,210 B2 5/2022 Benedetto
11,458,388 B1 * 10/2022 Kestell ................... A63F 13/42
(Continued)

FOREIGN PATENT DOCUMENTS

CN 109562298 B 6/2022
CN 118159929 A * 6/2024 .......... H04M 1/0279
(Continued)

OTHER PUBLICATIONS

Combined Search and Examination Report for corresponding GB Application No. 2214632.8, 7 pages, dated Mar. 30, 2023.
(Continued)

*Primary Examiner* — Steven J Hylinski
(74) *Attorney, Agent, or Firm* — Fish & Richardson P.C.

(57) ABSTRACT

A processing device includes: a detection unit configured to detect input information representative of a sequence of input signals for a video game that are input by a user using one or more input controls; an identification unit configured to identify one or more input signal variations in dependence upon one or more differences between the detected input information and predetermined input information representative of one or more predetermined sequences of input signals for the video game; a generation unit configured to generate assistance information in dependence upon the one or more identified input signal variations; and a provision unit configured to provide the generated assistance information to the user.

20 Claims, 2 Drawing Sheets

(56) References Cited

U.S. PATENT DOCUMENTS

| | | | | |
|---|---|---|---|---|
| 12,011,657 | B2 * | 6/2024 | Young | A63F 13/235 |
| 2011/0136568 | A1 * | 6/2011 | Buhr | A63F 13/22 463/37 |
| 2013/0173032 | A1 * | 7/2013 | Rom | A63F 13/25 700/91 |
| 2013/0288777 | A1 | 10/2013 | Short | |
| 2019/0038967 | A1 * | 2/2019 | Rom | A63F 13/22 |
| 2019/0232169 | A1 | 8/2019 | Benedetto | |
| 2019/0329138 | A1 | 10/2019 | Panesar | |
| 2021/0236944 | A1 * | 8/2021 | Summa | H04N 21/44008 |

FOREIGN PATENT DOCUMENTS

| | | | | |
|---|---|---|---|---|
| EP | 3808423 | A1 | 4/2021 | |
| WO | WO-2020172140 | A1 * | 8/2020 | A63F 13/79 |

OTHER PUBLICATIONS

Extended European Search Report for corresponding EP Application No. 23197208.4, 12 pages, dated Mar. 1, 2024.

* cited by examiner

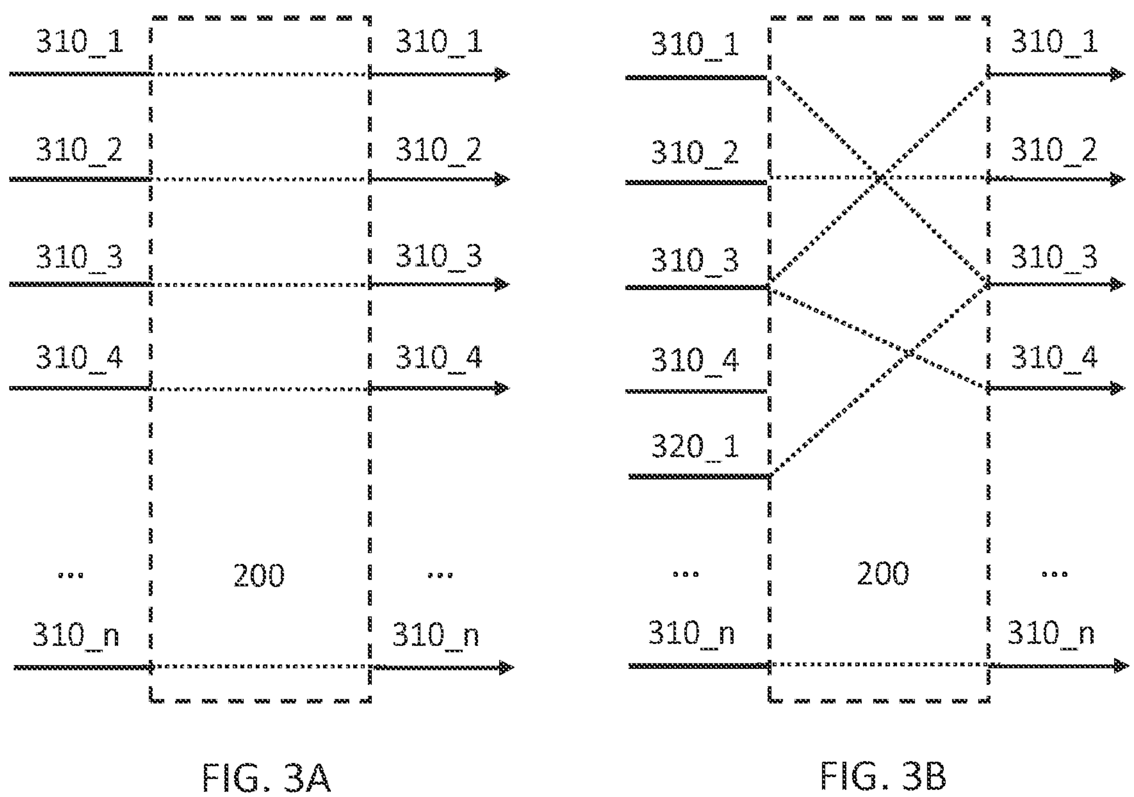
FIG. 3A
FIG. 3B
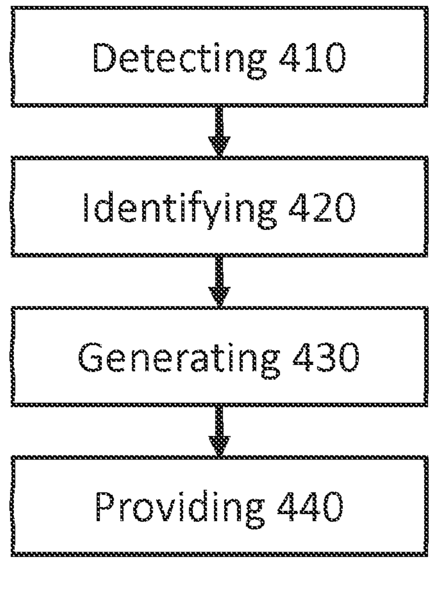
FIG. 4

PROCESSING DEVICES AND METHODS

BACKGROUND OF THE INVENTION

Field of Invention

The present invention relates to processing devices and methods.

Description of the Prior Art

One type of content that has become increasingly popular is interactive content, which is content that is responsive to a user input such as video games. Users may be able to provide input signals to a video game in a variety of ways. For example, a user will typically provide one or more input signals to a video game by using one or more input controls on a controller, or by using one or more inputs controls on a computer mouse and keyboard.

However, some users may find it difficult to use some types of input controls or to provide some types of input signals to a video game.

It is in this context that the present disclosure arises.

SUMMARY OF THE INVENTION

In a first aspect, a processing device is provided in claim 1.

In another aspect, a method is provided in claim 13.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A and 3B each illustrate an example of input signals being received and provided by an example processing device; and FIG. 4 schematically illustrates an example method.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
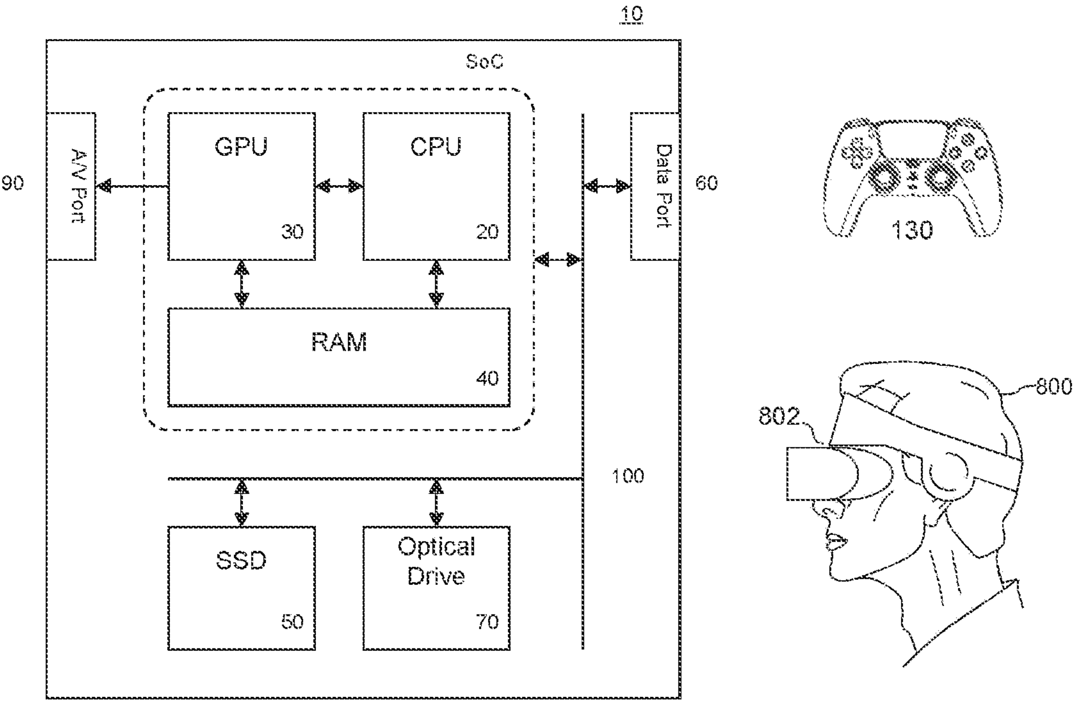
FIG. 1 schematically illustrates an example entertainment system.

Referring now to the drawings, wherein like reference numerals designate identical or corresponding parts throughout the several views, in FIG. 1 an example of an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 130, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800. Alternatively or in addition, a TV or monitor may be used.

Users may, to varying degrees, find it difficult to use some types of input controls or to provide some types of input signals to a video game. For example, when using one or more input controls on a controller, or by using one or more inputs controls on a computer mouse and keyboard.

Therefore, there is a need to provide users with a processing method and a processing device that may advantageously enable a user to improve their ability to provide one or more input signals to a video game.

Figure 2:
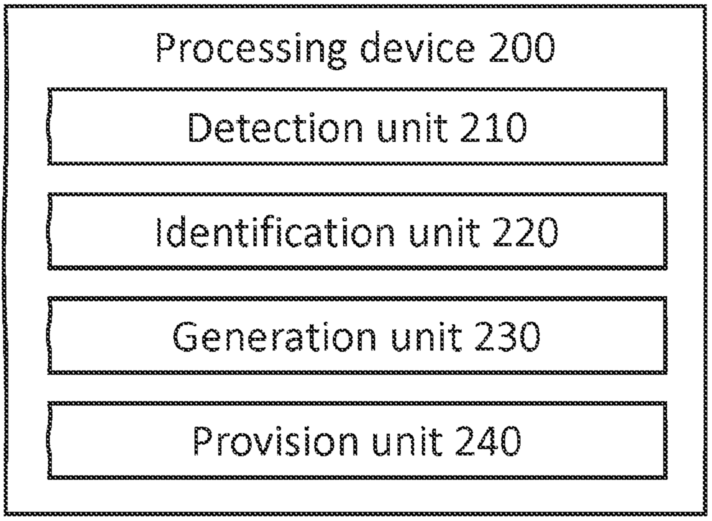
FIG. 2 schematically illustrates an example processing device.

Accordingly, turning now to FIG. 2, in an embodiment of the present description, a processing device 200 is provided. The processing device 200 comprises a detection unit 210; an identification unit 220; a generation unit 230; and a provision unit 240. Each of these units 210, 220, 230, 240 will now be discussed in turn.

The detection unit 210 is configured to detect input information representative of a sequence of input signals for a video game that are input by a user using one or more input controls.

An input control is any type of physical control that may be used to generate an input signal. For example, a button is one type of input control, and multiple buttons would provide multiple input controls. Other types of input controls include a thumbstick, triggers, a scroll wheel, a touchpad, a joystick, or any other type of physical control that may be physically interacted with to generate an input signal.

However, other types of physical controls may generate an input signal without any physical interaction. For example, an eye/gaze tracker or motion/gesture detector may be used to generate an input signal without any physical interaction. Other examples include voice or sound activated input controls.

An input signal is interpreted or processed (for example, by the entertainment device 10) for controlling one or more functions in the video game. Example functions in a video game that may be controlled by input signals include "jump", "fire", "crouch", "interact", "sprint", "change weapon", "use special ability", and "open container" for example. These are all examples of functions in a video game that may be controlled using an input signal provided by a digital input control, such as a button.

For example, a user's avatar in a video game may only be able to sprint or not sprint. In this example, a digital input control, such as a button, may provide a binary output as a digital input signal (i.e. when the button is pushed or not pushed), which is sufficient to control the "sprint" function.

Additionally, a digital input signal may control a function in a video game in several ways. For example, a function may only remain activated when an input signal is being continuously provided due to a corresponding input control being continuously activated by a user. For example, referring to the example in the preceding paragraph, a user's avatar may only sprint when a button corresponding to the "sprint" function is held down by a user. In this case, a function in the game is only activated while a corresponding digital input signal is being received that indicates that the corresponding input control is being engaged (e.g. by the user holding the button down). For simplicity, these cases will be referred to as a "held" input signal elsewhere herein, even though an input control may be continuously activated or engaged by other means, such as a user continuously gazing at a predetermined location when using a eye/gaze tracker as an input control.

Alternatively, a function in the video game may be toggled by an input signal. For example, a button may be pressed and then released by the user to cause the user's avatar to sprint until the button is pressed and released for a second time. In this case, a function in a video game may be activated in response to the receipt of a corresponding input signal and remain activated even when the reception of the digital input signal ceases. The function may then be deactivated in response to receiving the same corresponding input signal that activated the function. For simplicity, these cases will be referred to as a "toggle" input signal elsewhere herein.

However, the input controls may alternatively or additionally comprise analogue input controls, such as a thumbstick. For example, an analogue input control may be configured to generate analogue input signals that may control the movement of a user's avatar, where the speed of the avatar's movement is dependent upon the amount of displacement applied to the joystick. Therefore, analogue input signals may enable the user to precisely control the speed and direction of their avatar. Although, in some cases, this movement may also or instead be controlled using digital input signals generated using digital input controls.

Another example of a function in a video game that may controlled using an analogue input control, is the throttle of a vehicle, which may be controlled by analogue input signals, generated using an analogue trigger for example, where an analogue input signal may be provided in dependence upon the amount the trigger is pressed, which may correspond to the throttle applied to the vehicle.

It should be noted that the term "input signals" refers to one or more input signals that may comprise one or more digital input signals and/or one or more analogue input signals. Additionally, an analogue input control may provide one or more digital input signals (e.g. after analogue to digital conversion). For example, a threshold may be set for an analogue input control above which a digital input signal may be provided and below which no input signal may be provided. One or more other thresholds may also be set above the existing threshold, where a different digital control signal may be provided for each of the thresholds that the analogue input control is above. References herein to analogue inputs or input signals may thus be understood as appropriate to include digital input signals originating from analogue input sources such as thumb sticks or triggers.

Additionally, in some cases, some digital input signals may control a function in a video game only when used in conjunction with an analogue input signal. For example, a digital input signal that may activate the "sprint" function may, in some cases, activate the "sprint" function only when an analogue input signal that controls the movement of a user's avatar is also provided. In other words, if a user were to press a button on a controller to activate "sprint", it may only have an effect if the user is also using a thumbstick to control the movement of an avatar. Of course, in other cases, the "sprint" function could be activated by a digital input signal without any other input signals having to be provided at the same time, which may, for example, cause a user's avatar to sprint in the direction that the avatar is already facing.

Optionally, a plurality of input controls may be used to provide input signals for controlling a function in a video game. For example, a plurality of buttons may be used to provide an input signal for a "sprint" function.

In some cases, all of the plurality of buttons must be pressed simultaneously, or in a predefined series, for the input signal for the "sprint" function to be provided to the video game. In these cases, if one of the buttons is not pressed, or the predefined series is input incorrectly, no input signal may be provided to the video game.

Alternatively, any one of the buttons may be used to provide an input signal for the "sprint" function. In some cases, at least one of the buttons may be used to provide an input signal to toggle the "sprint" function and another of the buttons may be used to provide a "held" input signal for the "sprint" function.

Additionally, in some embodiments of the present disclosure, an input control may be configured to provide a plurality of input signals for controlling one or more functions in a video game. The plurality of input signals may be provided simultaneously or as a predefined series.

For example, a single button may initiate the provision of a predefined series of input signals to a video game. The first input signal of the predefined series of input signals may be interpreted for controlling a "change to ranged weapon" function, and a second input signal may be interpreted for activating a "special ability—rapid fire" function (which may only be used with a ranged weapon for example). Therefore, a user may be able to control a series of functions in a video game by a single use of one input control. It should be noted that the predefined series may comprise more than two input signals.

As another example, a single button may provide a plurality of input signals to a video game simultaneously. For example, a first input signal may be processed to activate a "jump" function, and a second input signal, provided simultaneously with the first input signal, may be processed to activate a "crouch" function. Therefore, when a user presses this button, the user's avatar in the video game may crouch and jump at the same time, which is commonly referred to as a crouch-jump. Similarly to the preceding paragraph, more than two input signals may be provided simultaneously using a single input control. Furthermore, a predefined series of input signals may also comprise a plurality of input signals to be provided simultaneously as one or more parts of the series.

The input information detected by the detection unit 210 is representative of a sequence of input signals. It should be noted that the sequence of input signals represented by the input information is not a predefined series of input signals that may be provided by a single input control, which is discussed above. Instead, the sequence of input signals are input by a user for a video game using one or more inputs controls. The information representative of the sequence of input signals may, for example, be the sequence of input signals itself, a relative frequency for respective ones of the input signals in the sequence, the input controls corresponding to respective ones of the input signals in the sequence, a sequence of input control operations made by the user, or any other suitable way of representing the sequence of input signals.

The detection unit 210 may detect one or more inputs signals from one or more input controls to detect the input information. For example, a controller with one or more input controls, such as the controller 130, may comprise the processing device 200. In this case, the detection unit 210 may detect when one of the input controls generates an input signal. Alternatively, an entertainment device, such as the entertainment device 10, may comprise the processing device 200. In this case, the detection unit may detect the one or more input signals when they are received by the entertainment device. The processing device 200 may then provide the input signals to the video game.

In some embodiments, the processing device 200 is separate to both the entertainment device and the controller (for example, being a phone of the user running a suitable app). In this case, the processing device 200 may receive a sequence of input signals transmitted by the controller, and the detection unit 210 may detect input information representative of the sequence of input signals for a video game in dependence upon the received sequence of input signals. In some cases, the controller may transmit the sequence of input signals to both the processing device 200 and to an entertainment device.

However, in some cases, the controller may transmit, either knowingly, or unknowingly if the processing device 200 spoofs the entertainment device, the sequence of input signals to the processing device 200 but not to the entertainment device. In these cases, the detection unit 210 may detect information representative of the sequence of input signals and then the processing device 200 may transmit the received sequence of input signals to the entertainment device for use by a video game being executed on the entertainment device (this may be the case for example when a user's phone, tablet, or other device is acting as a client of a cloud game streaming service, and the entertainment device is virtualised or otherwise provided by the cloud). The processing device 200 may transmit a respective input signal from the sequence of input signals as the respective input signal is received by the processing device 200 and/or detected by the detection unit 210.

Optionally, the processing device 200 may modify at least some of the received input signals to generate modified received input signals. The processing device 200 may then provide the modified received input signals to the entertainment device instead of the received input signals. The modification of input signals by the processing device 200 is described elsewhere herein with reference to FIGS. 3A and 3B. Although, it should be noted that the example of FIG. 3 is not limited to the processing device 200 being separate to both the controller and entertainment device, and may include the above-described examples where the processing device 200 is comprised by one of the controller or the entertainment device.

In some embodiments of the present disclosure, the sequence of input signals are used to control one or more functions of the video game during a predetermined portion of the video game. In these embodiments, the detection unit 210 may be configured to detect information representative of the sequence of input signals generated during a predetermined portion of the video game.

For example, the detection unit 210 may be configured to detect information representative of a sequence of input signals that are generated in one or more preselected areas of the video game, where the selected area is an example of the predetermined portion of the video game. Alternatively, or in addition, the detection unit 210 may be configured to, for each level of a video game, detect information representative of a sequence of input signals generated during the respective level of the video game.

Alternatively, or in addition, at least one predetermined portion may be a set period of time in response to, and/or directly after, a trigger event in the video game. For example, a trigger event may be a particular boss attack, entering a particular in-game area, or reaching a point in the video game where the user has previously failed to progress.

As an illustrative example, the set period of time may be the five seconds directly after the initiation of an attack by a boss type that requires precise combination of input signals to be provided in order to avoid the attack. Therefore, the detection unit 210 may be configured to detect information representative of a sequence of input signals during this five second period. In some cases, the information representative of the sequence of input signals may be as simple as whether or not the user was successful in avoiding the boss attack. Of course, the information representative of the sequence of input signals may also be the sequence of input signals generated during that five second period. Any other type of information that is representative of the sequence of input signals may alternatively, or in addition, be detected by the detection unit 210 as described elsewhere herein.

The predetermined portions, during which information representative of a sequence of input signals may be detected, may be chosen in advance by a game developer. Alternatively, or in addition a user may select one or more portions of the video game for which information representative of a sequence of input signals is to be detected by the detection unit 210. Therefore, if a user recognises that they are struggling to progress in a particular portion of the video game, the user may select that portion of the video game as a predetermined portion for which the detection unit 210 may be configured to detect information representative of a sequence of input signals.

Optionally, the input information may additionally be representative of a rate of progression in the video game.

The identification unit 220 is configured to identify one or more input signal variations in dependence upon, and may optionally be indicative of, one or more differences between the detected input information and predetermined input information representative of one or more predetermined sequences of input signals for the video game.

A predetermined sequence of input signals may, for example, be a sequence of input signals that have been detected for a previous user of the video game (a previous sequence of input signals). The previous sequence of input signals may be detected by the detection unit 210 of the processing device 200. Alternatively, or in addition, the previous sequence of input signals may be detected by a detection unit of another processing device having the same or a similar configuration of the processing device 200. In this case, the previous sequence of input signals could be downloaded by the processing device 200 over a network such as the internet.

In some cases, information representative of one or more previous sequences of input signals may only include information representative of the previous sequences of input signals where a rate of progression in at least a portion of the video game meets or exceeds a predetermined performance criteria when using the previous sequence of input signals for the at least a portion of the video game. The predetermined performance criteria may enable only beneficial previous sequences of inputs signals to be used by the processing device 200 (i.e. previous sequences that achieved or exceeded a minimum rate of progression in the video game).

Therefore, the identification unit 220 may be configured to identify one or more input signal variations from, and may optionally be indicative of, one or more differences between the detected input information and predetermined input information representative of one or more previous sequences of input signals that meet or exceed a predetermined performance criteria.

Alternatively, or in addition, one or more of the predetermined sequences of input signals may be provided to the processing device 200 by a developer. For example, a predetermined sequence of input signals may be a sequence of input signals that have to input in a specific order and/or within a set period of time in order to activate a special ability in a video game, such a predetermined sequence of input signals is often referred to as a "combo" or a "combo" sequence. As a "combo" sequence is typically a mechanic of a video game that is designed by a developer, the developer will be able to provide the processing device 200 with input information representative of one or more "combo" sequences of input signals.

The predetermined input information representative of the one or more predetermined sequences of input signals may take the same form as the detected input information as described elsewhere herein. Optionally, data representative of a plurality of predetermined sequences of input signals may be averaged to generate the predetermined input information.

Example differences between the detected input information and predetermined input information that may be used by the identification unit 220 include a difference, in a frequency of one or more of the input signals in a sequence of input signals relative to the other input signals in the sequence of input signals, between the sequence of input signals indicated by the detected input information and the one or more sequences of input signals indicated by the predetermined input information. For example, this may indicate that one or more input signals are being over or under used by a user. This also provides an example where, in some embodiments of the present disclosure, the one or more differences may correspond to a respective one or more of the input signals.

In the above example, in some cases, a difference in a frequency of one or more of the input signals in a sequence of input signals relative to the other input signals in the sequence of input signals may have no, or only a minimal, impact upon a rate of progression of the video game. In these cases, it may be desirable for the identification unit 220 to not use such a difference to identify an input signal variation.

Therefore, in some embodiments of the present disclosure, the identification unit 220 may be configured to identify the one or more input signal variations in dependence upon a relationship between the one or more differences and a rate of progression of the video game.

In these cases, for example, the identification unit 220 may be provided with information representative of the relationship. The information may be determined by a developer or the entertainment device for example. For example, a relationship may be identified by comparing, to a rate of progression of the video game, one or more differences between one or more of the predetermined sequences of input signals and another one or more of the predetermined sequences of input signals. In some cases, this comparison and identification of a relationship between the one or more differences and a rate of progression of the video game may be performed by the identification unit 220.

By identifying the one or more input signal variations in dependence upon the relationship between the one or more differences and the rate of progression of the video game, the functions of the generation unit 230 and the provision unit 240, which are described elsewhere herein, may advantageously be limited to the input signal variations having the most significant impact on a user's ability to progress in the video game.

In some embodiments of the present disclosure, the identification unit 220 may be configured to identify the one or more input signal variations in dependence upon one or more of the differences exceeding one or more thresholds.

For example, a difference, in a frequency of one or more of the input signals in a sequence of input signals relative to the other input signals in the sequence of input signals, between the sequence of input signals indicated by the detected input information and the one or more sequences of input signals indicated by the predetermined input information may only be identified as an input signal variation if the difference exceeds a threshold. Meanwhile, another difference of the same type but relating to another one or more of the input signals may only be identified as an input signal variation if the difference exceeds the same threshold or another threshold.

In these cases, the one or more thresholds may correspond to a respective one or more of the input signals. For example, a first threshold corresponds to differences for a first input signal, a second threshold corresponds to a second input signal, a third threshold corresponds to a third input signal, etc.

In some cases the identification unit 220 may be configured to identify the one or more thresholds in dependence upon the relationship between the one or more differences and the rate of progression of the video game.

For example, if a relationship between one of the differences and the rate of progression of the video game indicates that a small magnitude of that difference would have a large impact on the rate of progression in comparison to another one of the differences, the threshold for that difference may be identified set lower in comparison to the threshold set for the other difference. Therefore, a small magnitude of the difference would be identified as an input signal variation, but the same magnitude of the other difference would not be identified as an input signal variation.

Optionally, if the relationship between a difference and the rate of progression of the video game indicates that the difference has no, or only a minimal, effect upon the rate of progression of the video game, no threshold may be set for the difference. Therefore, in this case, the magnitude of the difference would be unable to exceed a non-existent threshold. Accordingly, an input signal variation indicative of that difference would not be identified by the identification unit 220.

Alternatively, or in addition, in some embodiments, one or more of the thresholds may be predetermined. For example, one or more of the thresholds may be predetermined on a video game by video game basis, or the one or more thresholds may be set by a user.

In some embodiments, an input signal variation may alternatively, or in addition, be identified in dependence upon, and may optionally indicative of, a difference between an average amount of time between a provision of a first type of input signal and a provision of a second type of input signal indicated by the detected input information, and an average amount of time between the provision of the first type of input signal and the provision of the second type of input signal indicated by the predetermined input information. This difference may, for example, indicate that it may be difficult for a user to switch from using an input control that provides an input signal of the first type to another input control that provides an input signal of the second type, which may be required to execute a special function in the video game that may be required to progress in the video game for example.

Accordingly, the input signal variations may be indicative of a user requiring, or potentially benefitting from, assistance with one or more input controls/signals because the input signal variations may indicate that the user is having difficulty, or becoming confused, with one or more of the input controls/signals. The input signal variations may alternatively or additionally be identified by the identification unit 220 in dependence upon the relevance of respective input signals to one or more tasks in the video game, optionally relative to the significance of a respective task to the rate of progression of the video game. Therefore, the input signal variations may be made more relevant to actual difficulties faced by the user in progressing in a video game, rather than a preference or style of playing the video game.

The generation unit 230 is configured to generate assistance information in dependence upon the one or more identified input signal variations. For example, the assistance information may comprise a recommendation to change an aiming sensitivity (optionally including a recommended aiming sensitivity value), a recommendation to enable gyroscopic aiming, and/or a recommend combination of input signals the may be provided by the user by using a single input control.

As another example, one or more of the identified input signal variations may indicate that a user may have difficulties using a particular input control. The particular input control may provide a particular input signal, which a reduced use of could be detrimental to the user's rate of progression in the video game, such as a particular input signal for controlling a function requiring frequent use to progress in the video game.

Therefore, in some embodiments, the generation unit 230 may be configured to generate assistance information comprising instructions for changing an input control for at least one of the input signals corresponding to at least one of the identified input signal variations to another input control that is not associated with the identified input signal variations.

For example, the input control for at least one of the input signals may be changed to a previously unused input control. As another example, the other input control may be selected in dependence upon one or more of a frequency of use of the other input control, a positional relationship between the input control to be changed and the other input control, the impact on the rate of progression of the video game of an input signal provided by the other input control (optionally, relative to the impact on the rate of progression of the video game of the input signal to be changed), or an input control that has been identified as being less problematic for the user. An input control may be identified as being less problematic for a user based on previously identified, or lack thereof, input signal variations related to the less problematic input control, or may be selected by the user in advance as a less problematic input control for example.

In some embodiments, the generated assistance information may alternatively, or additionally, comprise instructions for changing an input control for at least one of the input signals corresponding to at least one of the identified input signal variations by swapping the input control with another input control for at least another one of the input signals corresponding to at least one of the identified input signal variations.

Therefore, in some embodiments, the generated assistance information may comprise instructions for swapping a first input signal provided by a first input control with a second input signal provided by a second input control.

As an example, a reduced use of the first input signal may be detrimental to the user's rate of progression in the video game, and a level of use of the second input signal may have a minimal impact on the user's rate of progression in the video game. In this example, after the instructions are followed, the first input control would provide the second input signal and the second input control would provide the first input signal.

As a further example, the input signal variations may be indicative of a user experiencing confusion in regards to what input control provides which input signal. For example, the user may consistently activate a first input control (which provides a first input signal) when attempting to provide a second input signal and activate a second input control (which provides the second input signal) when attempting to provide the first input signal. This may be indicative of the user subconsciously associating the first input control with the second input signal and the second input control with the first input signal.

The context provided by the video game may be used to identify such a disparity between the user's intended input signal and the user's actually provided input signal. Therefore, by swapping the input signal that is provided by each of the first and second input controls with one another, the user's intended input signal and the user's actually provided input signal may match, with the first input signal being provided by the second input control and the second input signal being provided by the first input control after the swap.

Alternatively, or in addition, in some embodiments of the present disclosure, the generated assistance information may comprise instructions for changing the sensitivity of an analogue input. In this example, reduced use of the full gamut of the analogue input may be detrimental to the user's rate of progression in the video game, and so a re-mapping of the input scale (for example to the maximum or top centile, decile, or quartile activation of the analogue input observed from the user) will benefit the user's progression.

Therefore, if the user has difficulties using the first input control, which may be identified from an input signal variation by the identification unit 220, the generated assistance information may assist the user to improve the user's rate of progression in the video game.

Additionally, because the assistance information may, in some embodiments, be generated in dependence upon input signal variations that are identified in dependence upon a relationship between the one or more differences and a rate of progression of the video game, the generated assistance information may advantageously be better targeted towards an individual user.

Furthermore, as the generated assistance information may, in some embodiments, comprise instructions for changing a first input control to a second input control that is not associated with the identified input signal variations, the impact of such a change on the user's ability to play the video game may be advantageously reduced.

The provision unit 240 is configured to provide the generated assistance information to the user. For example, the provision unit 240 may provide the generated assistance information to the user by outputting the assistance information via a display, which may be separate to the processing device 200, or may alternatively or additionally be a component of the processing device 200.

Alternatively, or in addition, the generated assistance information may be provided to the user, by the provision unit 240, via an audio output, which may be separate to the processing device 200, or may alternatively or additionally be a component of the processing device 200.

Referring to the above example where the generated assistance information comprises instructions for changing an input control for an input signal to another input control that is not associated with the identified input signal variations, in this example, the provision unit 240 may, in some embodiments, be configured to output the instructions for display to provide the generated assistance information to the user.

Alternatively, or in addition, in some embodiments, the provision unit 240 may be configured to process the instructions to change the input control, for the at least one of the input signals corresponding to at least one of the input signal variations, to the input control that is not associated with the identified input signal variations.

Therefore, the user may automatically, or after an optional confirmation, be provided with the assistance indicated by the generated assistance information. In this example, the instructions may be machine-readable instructions for example, which may be processed by the provision unit 240 to execute the change of input control for the at least one of the input signals.

In some cases, the processing device 200 may receive the input signals from a controller and provide the input signals to an entertainment device, as described elsewhere herein. In these cases, rather than the change of input control for the at least one of the input signals being performed at the controller or at the entertainment device, the provision unit 240 of the processing device 200 may execute the change of input control for the at least one of the input signals by modifying what input signal that is provided to the entertainment device in response to the receipt of a particular input signal by the processing device 200.

An illustrative example is provided by FIGS. 3A and 3B. FIGS. 3A and 3B illustrate a representative example of a processing device 200 receiving input signals 310 on the left-hand side, from which detection unit 210 may detect input information representative of a sequence of the received input signals, and providing input signals 310 on the right-hand side.

It should be noted that these figures merely show, via the dotted lines through the processing device 200, what input signals will be provided by the processing device 200 in response to each received input signal. Some of the input signals may never be received by the processing device 200, and the input signals do not have to be received by the processing device 200 at the same time.

For example, FIG. 3A shows that the processing device 200 will: provide the input signal 310_1 in response to receiving the input signal 310_1; provide the input signal 310_2 in response to receiving the input signal 310_2; provide the input signal 310_3 in response to receiving the input signal 310_3; provide the input signal 310_4 in response to receiving the input signal 310_4; and provide the input signal **310_*n* in response to receiving the input signal 310_*n***.

It should also be noted that FIG. 3A shows what input signals will be provided by the processing device 200 in response to each received input signal prior to a modification of what input signals are provided by the processing device 200 in response to each received input signal, and FIG. 3B illustrates an example of what input signals may be provided by the processing device 200 in response to each received input signal after the modification.

Therefore, FIG. 3A shows the processing device 200 acting as a relay for each of the input signals received by the processing device 200. In this case, the input signals provided by the processing device 200 are the same as the input signals that are received by the processing device 200. However, the detection unit 210 may detect may detect input information representative of a sequence of the received input signals.

Meanwhile, FIG. 3B illustrates one possible modification of what input signals are provided by the processing device 200 in response to each received input signal. In this example, the processing device 200 will provide the input signal 310_3 in response to receiving the input signal 310_1 (but will not provide the input signal 310_3 in response to receiving the input signal 310_3).

Therefore, in a case where an input control may only be able to provide one type of input signal (e.g. input signal 310_1) and cannot change which input signal is provided by the input control, the processing device 200 be used to modify the input signal that is received an entertainment device by providing the entertainment device with a different input signal (e.g. input signal 310_3) in response to receiving the input signal (e.g. the input signal 310_1) from the input control.

Not all of the input signals provided by the processing device 200 in response to each received input signal need to be modified. In the example of FIG. 3B, the processing device 200 will provide an input signal 310_2 in response to receiving the input signal 310_2.

Additionally, in some cases, no input signals may be provided by the processing device 200 in response to receiving one or more of the input signals. In the example of FIG. 3B, the processing device 200 will not provide an input signal in response to receiving the input signal 310_4.

Furthermore, in some cases, the processing device 200 may provide two or more input signals in response to receiving one input signal. In these cases, at least two of the two or more input signals may be provided concurrently. Alternatively, or in addition, at least one of the two or more input signals may be provided before at least another one of the two or more input signals are provided by the processing device 200.

Therefore, in the example of FIG. 3B, the processing device 200 may provide the input signals 310_1, 310_4 in response to receiving the input signal 310_3. In this case, both input signals 310_1, 310_4 may be provided concurrently, the input signal 310_1 may be provided prior to the input signal 310_4 being provided, or the input signal 310_4 may be provided prior to the input signal 310_1 being provided, by the processing device 200 in response to receiving the input signal 310_3.

Additionally, FIG. 3B shows an addition input signal 320_1 that may be generated by another input control that was not used in the example of FIG. 3A. In some cases, the input signals 310 that are provided to the processing device 200 may all be generated by input controls comprised by the same controller (although they may in other cases be comprised by two or more controllers). In these cases the input signal 320_1 may be provided to the processing device 200 in response to the activation of an input control comprised by another controller (although in other cases it the input signal 320_1 may simply be a previously unused input signal), which may enable another user to control the functionality of the video game associated with that input signal for example. Therefore, the new input signal 320_1 may be received by the processing device to trigger the provision of one of the previously used input signals (in the example of FIG. 3B, the input signal 310_3).

Additionally, the input signal 310_3 may be provided by the processing device 200 in response to receiving either input signals 310_1 or 320_1, or may only be provided by the processing device 200 in response to receiving both the input signals 310_1 and 320_1 concurrently, which may be advantageous if a user may frequently use one of the input controls corresponding to the input signals 310_1 and 320_2 by mistake.

Meanwhile input signal **310_*n*** may for example be an analogue signal, and may be remapped so that a partial input range lying within regular use of the user now corresponds to the full input range.

It will be appreciated that whilst a detailed example has been provided with regards to buttons, the techniques herein apply to other input modalities discussed previously; hence for example different gestures or poses may be swapped, rather than controller inputs, for similar reasons; and the range or gamut of an analogue input (e.g. extent or speed of a gesture, or extent of a glance) may be remapped to that exhibited by the user.

Optionally, the provision unit 240 may be configured to provide the generated assistance information to the user at one or more predefined points of the video game. For example, predefined points may be selected so as to minimise the disruption to the user by the provision of the generated assistance information by the provision unit 240. Predefined points may be selected by a game developer or a user for example. Example points that may be suitable for the provision of the generated assistance information to the user by the provision unit 240 may include: loading screens; a failure state in the video game such as the death of the user's avatar; when the video game is paused by the user; when a menu interface is open; or any other suitable point of the video game.

Referring now to FIG. 4, in some embodiments, a method 400 is provided. The method 400 comprises the steps of detecting 410 input information representative of a sequence of input signals for a video game that are input by a user using one or more input controls; identifying 420 one or more input signal variations in dependence upon one or more differences between the detected input information and predetermined input information representative of one or more predetermined sequences of input signals for the video game; generating 430 assistance information in dependence upon the one or more identified input signal variations; and providing 440 the generated assistance information to the user. In these embodiments, communication using the second communication protocol has a longer range than communication using the first communication protocol.

In some embodiments of the present disclosure, a computer program is provided. The computer program comprising computer executable instructions adapted to cause a computer system to perform any of the methods described elsewhere herein.

It will be appreciated that the above methods may be carried out on conventional hardware (such as the content processing device 200, entertainment device 10, or controller 130) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A computer-implemented method comprising:

receiving a set of input signals for a video game that are generated when a user selects one or more input controls;

identifying one or more input signal variations between the received set of input signals and a predetermined set of input signals that are associated with successful progression through the video game;

determining an impact of an adjustment to the received set of input signals on a rate of progression through the video game;

determining that the impact of the adjustment satisfies one or more criteria;

in response to determining that the impact of the adjustment satisfies the one or more criteria, generating the adjustment to the received set of input signals; and providing the adjustment to the received set of input signals.

2. The method of claim 1, wherein the user selects the one or more input controls comprises gazing at a predetermined location in a gaming environment of the video game.

3. The method of claim 1, wherein identifying the one or more input signal variations comprises identifying a difference between a frequency of using an input signal in the received set of input signals and a frequency of using the corresponding input signal in the predetermined set of input signals.

4. The method of claim 1, wherein receiving the set of input signals for the video game comprises receiving the set of input signals generated in a preselected area of the video game.

5. The method of claim 1, wherein receiving the set of input signals for the video game comprises receiving the set of input signals generated during a predetermined period of time immediately after a trigger event in the video game.

6. The method of claim 1, wherein the predetermined set of input signals comprises a plurality of input signals generated in a predetermined order during a predetermined period of time.

7. The method of claim 1, wherein the predetermined set of input signals is generated by averaging a plurality of sets of input signals.

8. The method of claim 1, wherein identifying the one or more input signal variations comprises identifying a difference between a first period of time from a provision of a first input signal to a second input signal in the received set of input signals and a second period of time from a provision of the corresponding first input signal to the corresponding second input signal in the predetermined set of input signals.

9. The method of claim 1, wherein generating the adjustment to the received set of input signals comprises swapping a first input signal in the received set of input signals with a second input signal in the received set of input signals, wherein the first input signal and the second input signal are associated with a different input control.

10. The method of claim 1, wherein generating the adjustment to the received set of input signals comprises remapping a particular input signal in the received set of input signals, so that a partial input range of the particular input signal corresponds to a full input range of the particular input signal.

11. A system comprising one or more computers and one or more storage devices storing instructions that are operable, when executed by the one or more computers to cause the one or more computers to perform operations comprising:

receiving a set of input signals for a video game that are generated when a user selects one or more input controls;

identifying one or more input signal variations between the received set of input signals and a predetermined set of input signals that are associated with successful progression through the video game;

determining an impact of an adjustment to the received set of input signals on a rate of progression through the video game;

determining that the impact of the adjustment satisfies one or more criteria;

in response to determining that the impact of the adjustment satisfies the one or more criteria, generating the adjustment to the received set of input signals; and providing the adjustment to the received set of input signals.

12. The system of claim 11, wherein the user selects the one or more input controls comprises gazing at a predetermined location in a gaming environment of the video game.

13. The system of claim 11, wherein identifying one or more input signal variations comprises identifying a difference between a frequency of using an input signal in the received set of input signals and a frequency of using the corresponding input signal in the predetermined set of input signals.

14. The system of claim 11, wherein the predetermined set of input signals comprises a plurality of input signals generated in a predetermined order during a predetermined period of time.

15. The system of claim 11, wherein the predetermined set of input signals is generated by averaging a plurality of sets of input signals.

16. The system of claim 11, wherein identifying one or more input signal variations comprises identifying a difference between a first period of time from a provision of a first input signal to a second input signal in the received set of input signals and a second period of time from a provision of the corresponding first input signal to the corresponding second input signal in the predetermined set of input signals.

17. The system of claim 11, wherein generating the adjustment to the received set of input signals comprises swapping a first input signal in the received set of input signals with a second input signal in the received set of input signals, wherein the first input signal and the second input signal are associated with a different input control.

18. The system of claim 11, wherein generating the adjustment to the received set of input signals comprises remapping a particular input signal in the received set of input signals, so that a partial input range of the particular input signal corresponds to a full input range of the particular input signal.

19. One or more non-transitory computer storage media encoded with computer program instructions that when executed by one or more computers cause the one or more computers to perform operations comprising:

receiving a set of input signals for a video game that are generated when a user selects one or more input controls;

identifying one or more input signal variations between the received set of input signals and a predetermined set of input signals that are associated with successful progression through the video game;

determining an impact of an adjustment to the received set of input signals on a rate of progression through the video game;

determining that the impact of the adjustment satisfies one or more criteria;

in response to determining that the impact of the adjustment satisfies the one or more criteria, generating the adjustment to the received set of input signals; and providing the adjustment to the received set of input signals.

20. The non-transitory computer storage media of claim 19, wherein generating the adjustment to the received set of input signals comprises remapping a particular input signal in the received set of input signals, so that a partial input range of the particular input signal corresponds to a full input range of the particular input signal.

* * * * *